(12) United States Patent
Bernal

(10) Patent No.: US 11,690,366 B2
(45) Date of Patent: Jul. 4, 2023

(54) CAROUSEL-TYPE TRAP FOR INSECTS

(71) Applicant: Ricardo Alvarado Bernal, Mexico City (MX)

(72) Inventor: Ricardo Alvarado Bernal, Mexico City (MX)

( * ) Notice: Subject to any disclaimer, the term of this patent is extended or adjusted under 35 U.S.C. 154(b) by 163 days.

(21) Appl. No.: 17/203,213

(22) Filed: Mar. 16, 2021

(65) Prior Publication Data

US 2022/0061299 A1 Mar. 3, 2022

(30) Foreign Application Priority Data

Sep. 2, 2020 (MX) .................... MX/a/2020/009119

(51) Int. Cl.
*A01M 1/02* (2006.01)
*A01M 1/10* (2006.01)

(52) U.S. Cl.
CPC ............ *A01M 1/026* (2013.01); *A01M 1/106* (2013.01)

(58) Field of Classification Search
CPC .......... A01M 1/106; A01M 1/02; A01M 1/10; A01M 1/026
See application file for complete search history.

(56) References Cited

U.S. PATENT DOCUMENTS

| | | | | | |
|---|---|---|---|---|---|
| 8,252 | A | * | 7/1851 | Snow | 43/122 |
| 2,492,957 | A | * | 1/1950 | Blair | A01M 23/24 43/120 |
| 2,667,716 | A | * | 2/1954 | Garcia | A01M 1/02 43/111 |
| 4,152,862 | A | * | 5/1979 | Mohiuddin | A01M 1/10 43/121 |
| 4,706,410 | A | * | 11/1987 | Briese | A01M 1/106 43/107 |
| 5,749,168 | A | * | 5/1998 | Chrysanthis | A01M 1/14 43/131 |
| 6,532,695 | B1 | * | 3/2003 | Alvarado | A01M 1/2016 43/107 |
| 8,490,324 | B2 | * | 7/2013 | Highet | A01M 25/00 43/131 |
| 8,943,742 | B2 | * | 2/2015 | Aiayedh | A10M 1/10 43/111 |

* cited by examiner

*Primary Examiner* — Peter M Poon
*Assistant Examiner* — Carly W. Lynch
(74) *Attorney, Agent, or Firm* — Nixon & Vanderhye, PC

(57) ABSTRACT

The invention refers to a Carousel-Type Insect Trap, in order to control or monitor insects through different types of bait mounted on a carousel, thus facilitating the handling of baits used in traps for the monitoring of insects, which is of great economic importance, with uniformity and consistency, thus establishing a world-wide monitoring system for plague control, which will allow us to compare capture results with no variables in the handling and placement of baits and retention substrates inside the traps.

22 Claims, 13 Drawing Sheets

CAROUSEL-TYPE TRAP FOR INSECTS

BACKGROUND

1. Field of the Invention

This invention refers to the monitoring and control of plagues, more specifically, a trap for insects in which the trap for insects may provide several different types of baits placed on a carousel-type device.

2. General Background of the Invention

With the purpose of facilitating the monitoring and control of the population of insects, the need to use of a variety of conventional traps is present, which use several support structures to place baits, these structures are currently limited by the physical shapes of the baits or the design of the trap itself. The term "bait" generally refers to a chemical agent, which may exist in its pure state or in combination with another agent. Other agents may include destruction agents in which the structure of the bait may also provide an elimination mechanism for insects or coupling agents used to fix the bait on a structure attached to said mechanism. The death of the insect may occur through adhesion, poisoning or another disabling mechanism. The majority of individual traps currently available only support one or two types of structures for baits, and will only allow a maximum of two simultaneous baits. Baits are not always available to be placed on a single support structure within the trap, the structure is usually formed in accordance with the transportation requirements of the raw material or simply by the manufacturer's design:

The difference in support structures for the bait may be attributed to the composition of the bait itself. Not all the compositions may be compatible with a card, for example. Some compositions must exist necessarily as liquids, and their liquid nature may be vital for the transportation of the luring material. As every different type of support structure for attracting materials would require the purchase of a trap that fits its specific shape, size and requirements. Therefore, currently, several existing inventions that do not allow the use of simultaneous baits, which will require the user to purchase and maintain a higher number of traps, and each different type will allow the use of a single type of bait. For a user that required a high number of traps in order to cover a significant area, the cost of purchasing several types of traps in order to use different types of support structures for the bait may be prohibitively expensive and the storage may result prohibitively cumbersome. For instance, a user requiring only 100 traps to cover a given area shall purchase 300 traps in order to use three different types of support structure for the bait, three times the amount that would normally be necessary, in this context, we observe the following inventions, which have been developed for pest control purposes.

U.S. Pat. No. 4,501,088 from Feb. 26, 1985 titled "Fly trap with disposable collector", which shows an upper compartment with several chambers, and the bait placed in a concentric position from said chambers, which is ingested by insects, and when the bait has produced the intended result, insects fall on the disposable collector arranged in the upper part of said upper compartment, with the purpose of carrying out the maintenance of the disposable collector once it has been filled; however, said insect trap is only viable for a single type of bait and the bait is located only in a specific part of the trap, which makes said trap highly specific for the type of insect to be lured in.

Spanish Patent Application ES 2 589 814 from Nov. 16, 2016, titled Trap Device for Insects, this device has the versatility of being able to combat several types of insects, and this is achieved by being built on a hollow body, with several compartments for several baits; however, said trap tends to be more complex if the number of baits is increased. Throughout the application only two compartments are observed, which complicates the addition of more baits by using said device.

Korean Patent KR 10-1105164 from Jan. 17, 2012, titled "Fly Trap", said invention describes a container formed by two chambers, one that will contain the bait in the upper part and one lower chamber in which flies will be captured, and being constrained due to the trap's design, the flies drop by means of a liquid contained in the lower chamber, the chamber system of said trap is highly efficient; however, a variety of baits for different types of insects is not possible, thus making that trap very specific for a single type of insect.

However, several baits have been developed, which require the use of more supporting elements within the same trap and not making the same mistake, when the use of different types of devices became very expensive. Although the trap was an invention that solved the problem of providing support for the baits, a solution was required in order to attend the needs derived from the development of new baits. Additionally, recent research has found some problems in the management of baits with this and other traps used in controlling and monitoring of insects.

In light of the above, in the month of April of 2000, a trap for the monitoring and capturing of insects was developed, which has a structure with supports and containers arranged to place several types of bait, solid, liquids, or glue boards, which may be placed on a basket within the trap, or be deposited in the lower part of said trap if the bait is liquid, as well as adhering to the walls of the device or be hung from the flaps in the upper part. The main entry for insects is the trap's lower part. The insect trap may be used for monitoring (finding out if the plague is present) or for control (reduction or elimination of the plague).

From the aforementioned and existing background, a Carousel-Type Trap for Insects has not been found with the characteristics that we have proposed, perceiving the need for a Carousel-Type Trap for Insects; that being the reason for the development of this invention, which is described in detail below.

SUMMARY OF THE INVENTION

This invention referred as a Carousel-Type Insect Trap used mainly to combat different types of insects and which, due to its dimensions, is able to resist high weight loads and provide an adequate space to feed insects.

The purpose of the present invention is, therefore, providing a Carousel-Type Insect Trap to assist in the monitoring and control of plagues preventing bait contamination.

Another purpose of the Carousel-Type Insect Trap is achieving an optimum sealing process between the carousel's cover and the deposit for liquids, through an adjusting edge, which will firmly secure and seal the cover and the deposit, thus preventing any contamination or spilling of the liquid or any substance outside the Trap.

The problem is that bait users were in physical contact with the bait, and being in physical contact decreases the efficiency, in addition to contaminating the bait, another existing problem is that the trap is in contact with the bait due to its current design, thus decreasing its efficiency and causing a probable contamination of the bait, another problem that we faced was the development of baits with one or more components that adhere to the trap's walls in different orders and positions, and chemical agents are impregnated on plastic, thus decreasing their efficiency and contaminating the system, the contamination of the control or monitoring system makes the trap less efficient, as external contamination of the trap may imply the possibility that insects may stand on the trap and not be captured.

The trap, used with boards or patches adherable to the walls, obstruct light, thus decreasing the clarity in the upper part of the trap, giving insects the possibility of escaping, due to the fruit fly's behavior of flying towards the light.

Another current problem is the decrease in the duration and clarity of plastic, by not being cleaned with any substance in the moment of replacing baits.

Another purpose of the carousel is facilitating the handling of baits used in traps for the monitoring of insects, which is of economic importance, with uniformity and consistency, in order to establish a world-wide plague monitoring system, which shall allow us to compare capture results with no variables in the handling and placement of baits and retention substrates inside the traps. The novelty of this carrousel is primordially the elimination of contamination in traps and baits. All the baits that have been used until now are in contact with the trap and its operator. With the Carousel, contact with the trap's bait is eliminated, and by using a bait inside a container or deposit, which may be placed on the carousel, contact contamination from the trap's user is avoided. Currently, membrane-type bait is adhered to the walls of the trap in different types of arrangements and positions and chemicals are impregnated on plastic surfaces, the same happens with handling, in which the user touches and adheres the bait into the trap, thus contaminating the bait. Another objective that we have achieved is removing light obstruction, by not having anything on the walls, clarity does not decrease in the trap's upper part, thus preventing insects from escaping, due to the behavior of fruit flies, which is flying towards the light, and by not being able to take off, they do not damage the trap's plastic wall, and therefore the trap's clarity is not affected.

The characteristics of this novel Carousel-Type Insect Trap are detailed in the following description and images of the present invention.

BRIEF DESCRIPTION OF THE DRAWINGS

In order to complement the description above and with the purpose of facilitating the understanding of the characteristics of the invention, the description is accompanied, and being also part thereof, by a series of drawings, which include, but are not limited to.

DETAILED DESCRIPTION OF THE INVENTION

Below, a detailed description of the present invention is given with reference to the figures.

Figure 1:
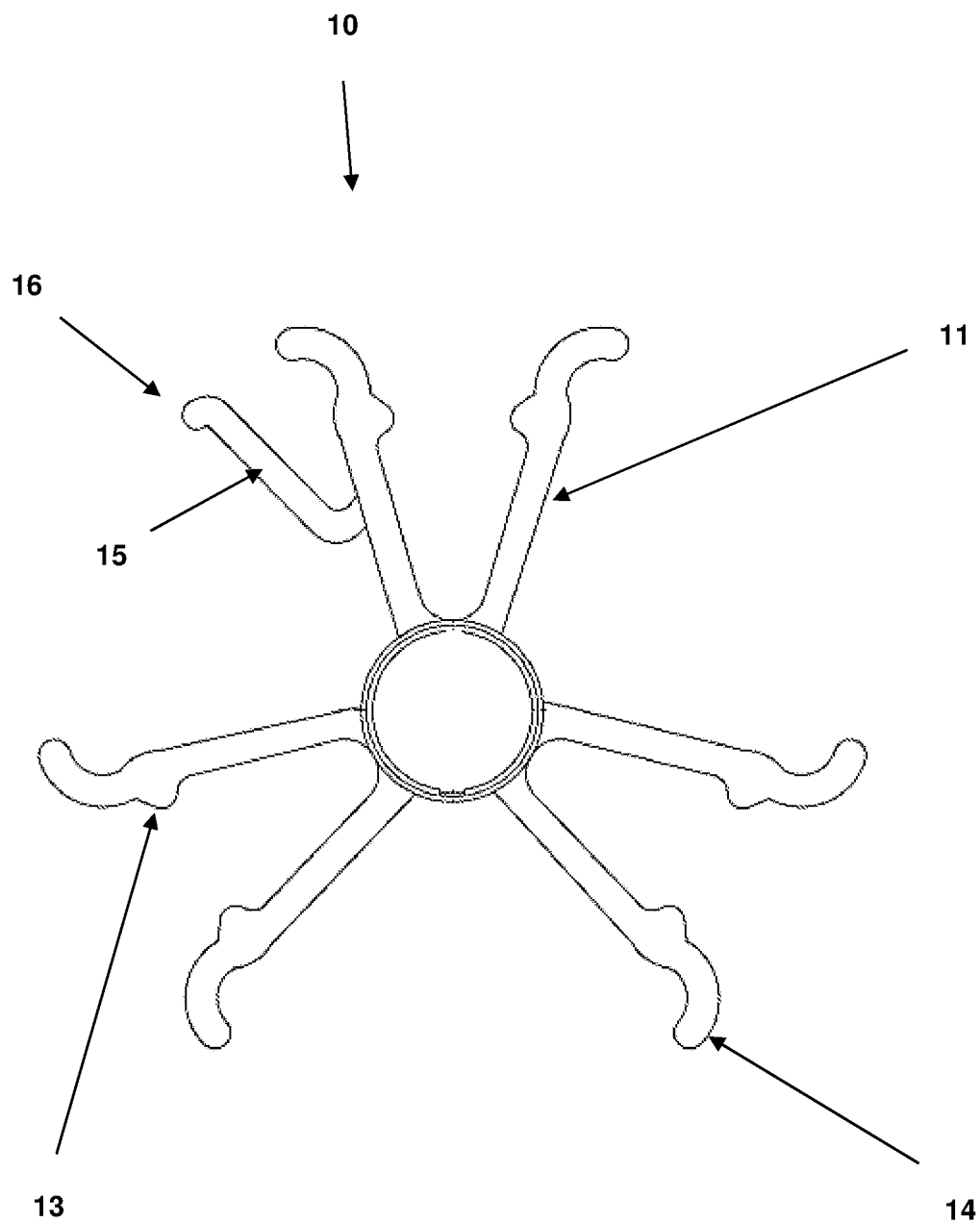
FIG. 1. Shot of the Carousel's main view from above.
Figure 2:
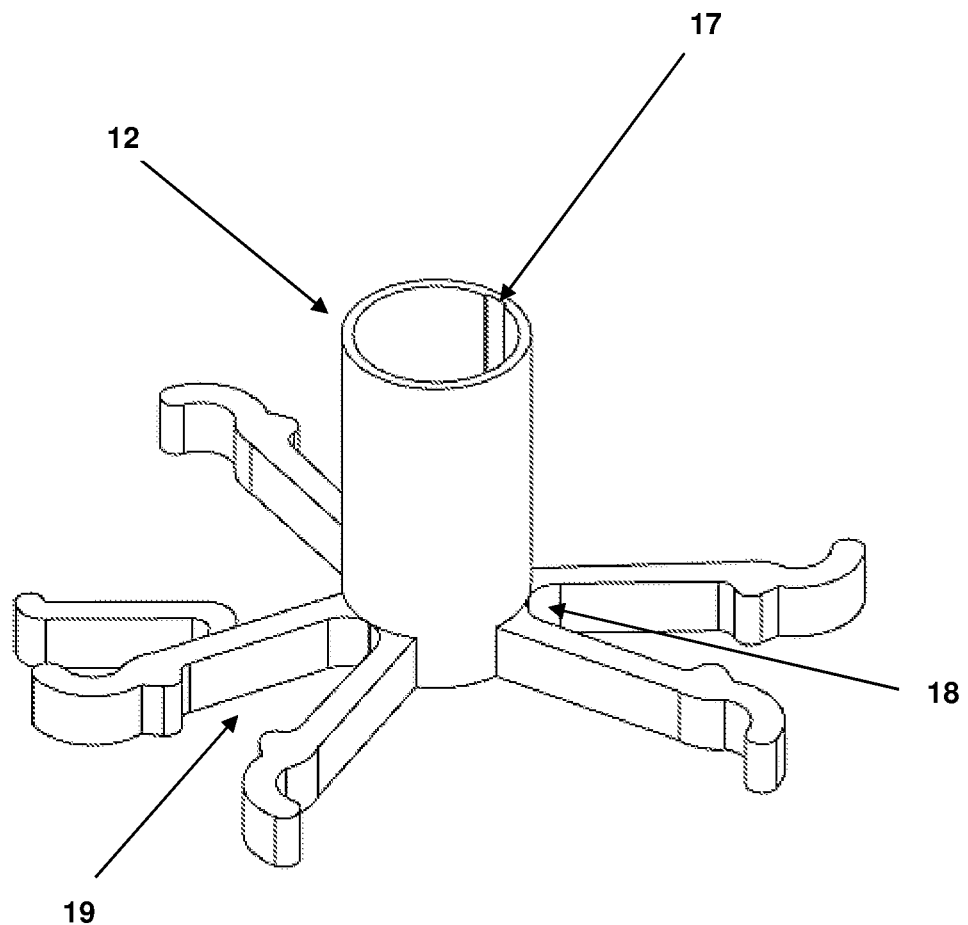
FIG. 2. Shot of the Carousel's main isometric view.
Figure 3:
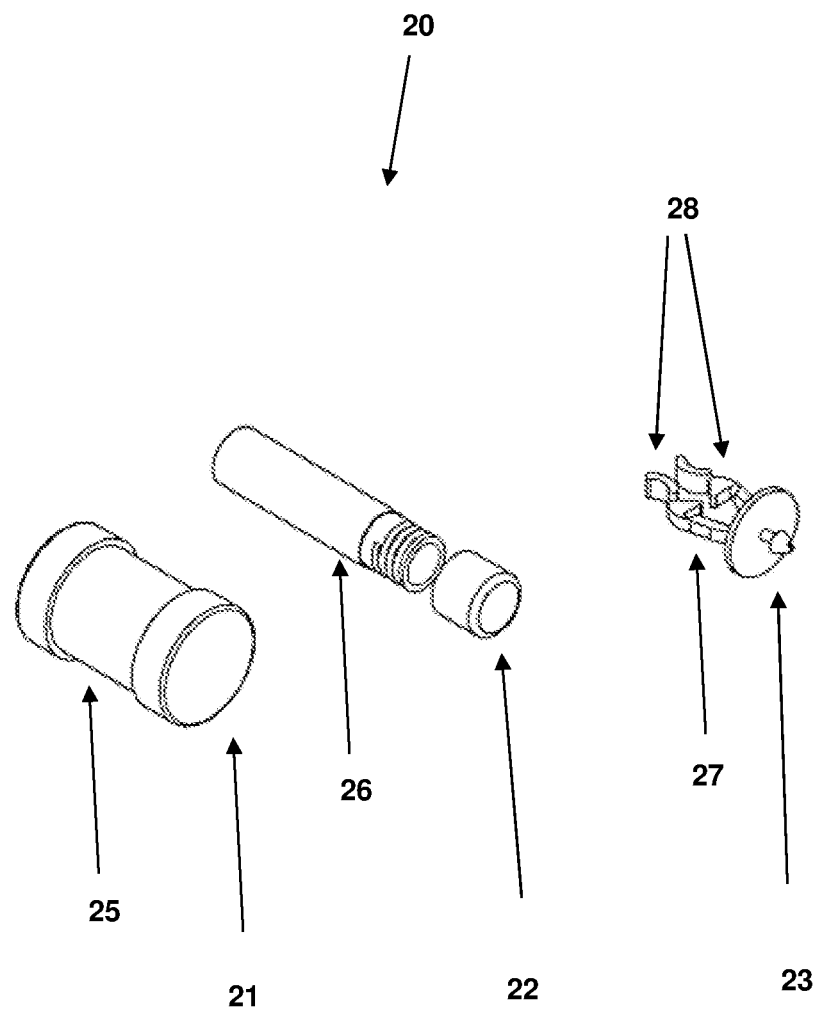
FIG. 3. Shot of the main isometric view of bait structures.

According to the present invention, the Carousel-Type Insect Trap comprises a main piece of the invention, known as the Carousel 10, which may be observed in FIG. 1, comprising clamping arms 11 which have been attached to a tubular piece 2, in said clamping arms 11 are projected longitudinally and concentrically towards the outside of the surface of the tubular piece 12 until a predetermined distance, which is adequate for clamping, each clamping arm 11 has means of support 13 located in proximity to the distal end of the tubular piece, said means of support 13 are used to place the bait structures 20, which may be observed in FIG. 3, continuing with the description of the carousel 10 shown in FIGS. 1 and 2, said clamping arms 11 have a curved ending 14 designed for the manipulation of each clamping arm 11, by the user, in order place the bait structures 20 without touching the active substance, thus preserving the intact properties of said active substance.

The Carousel 10 shown in FIGS. 1 and 2 comprises one additional clamping arm 15 projected from a clamping arm 11, thus, a clamping arm 11 supports one additional clamping arm 15 with a curvature in the end of the clamping arm 16 arranged for the manipulation of said clamping arm and insert a bait 20 between the additional clamping arm 15 and the clamping arm 11.

The clamping arms 11 come from the aforementioned carousel 10, in pairs provided by a coupling 18 between two arms, located in proximity to the tubular peace 12, thus the pair of clamping arms 11 provide means of support 13 opposed between the inner walls of each arm, thereby enabling the clamping of the bait structures 20; additionally, the clamping arms 11 have an additional flexibility in order to be slightly separated and introduce the bait structure 20 between said means of support 30 and be clamped the means of support are released from tension.

In Carousel 10, specifically between two clamping arms 11 a clamping space 19 is created, acting as a supporting clamp for a cylindrical bait structure 21 and the means of support 13 acting as means of blockage in order to fix the bait structures 20 between a pair of clamping arms 11.

Figure 7:
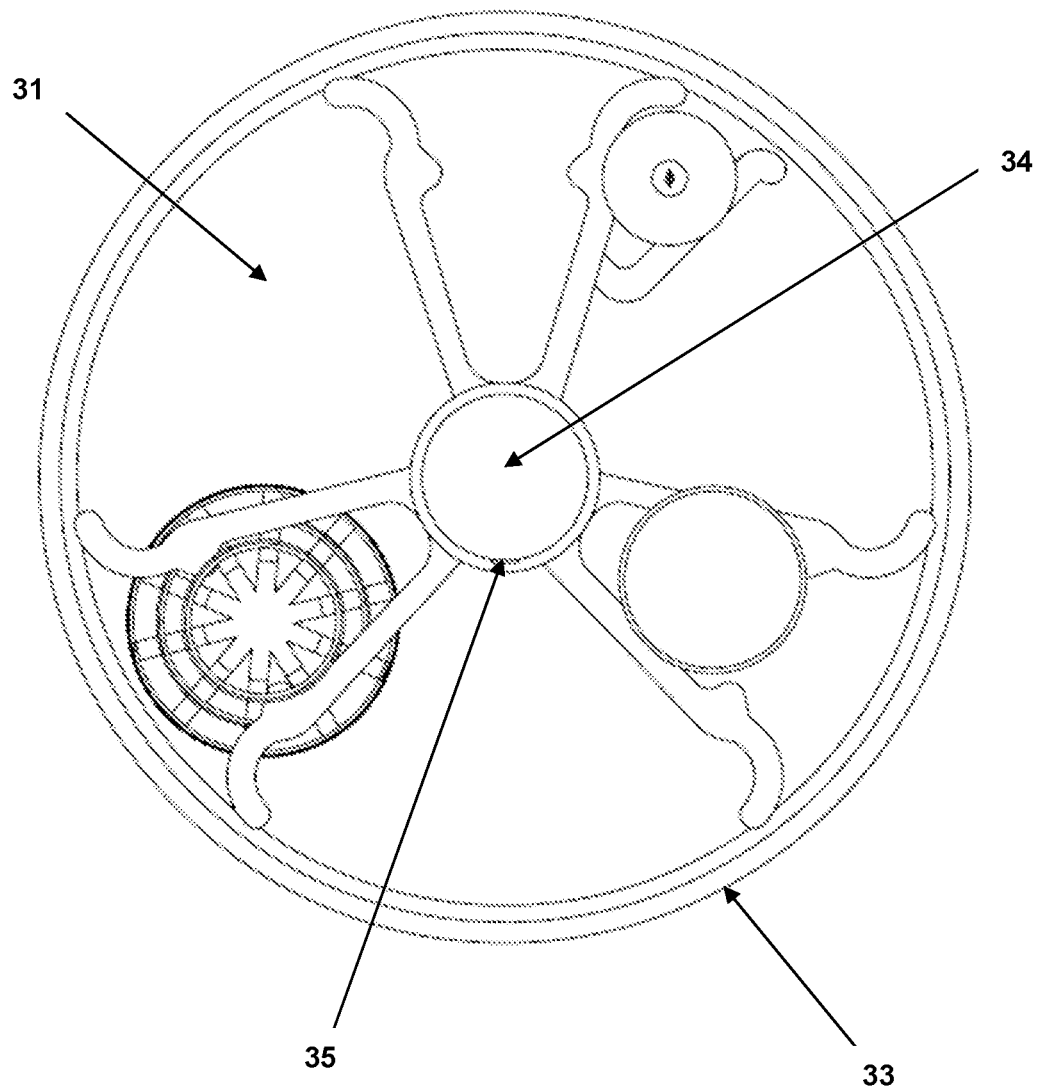
FIG. 7. Shot of the main view from above of the Carousel with bait structures mounted on a tray.

A tubular piece may 12 may be observed in FIG. 2, being hollow and having inside its internal part a guide pin 17 which is longitudinally projected in the internal part of the tubular piece 12, the internal hollow part of the tubular piece 12 will be coupled to the central axis of the tray 34, illustrated in FIG. 7, inserted inside the inner hollow wall of tubular piece 12 thereby securing both pieces through a pin 35 in the guide pin 17, thereby fixating both pieces, with the possibility of disassembling both pieces in the event of requiring any sort of maintenance, repair or cleansing.

Figure 4:
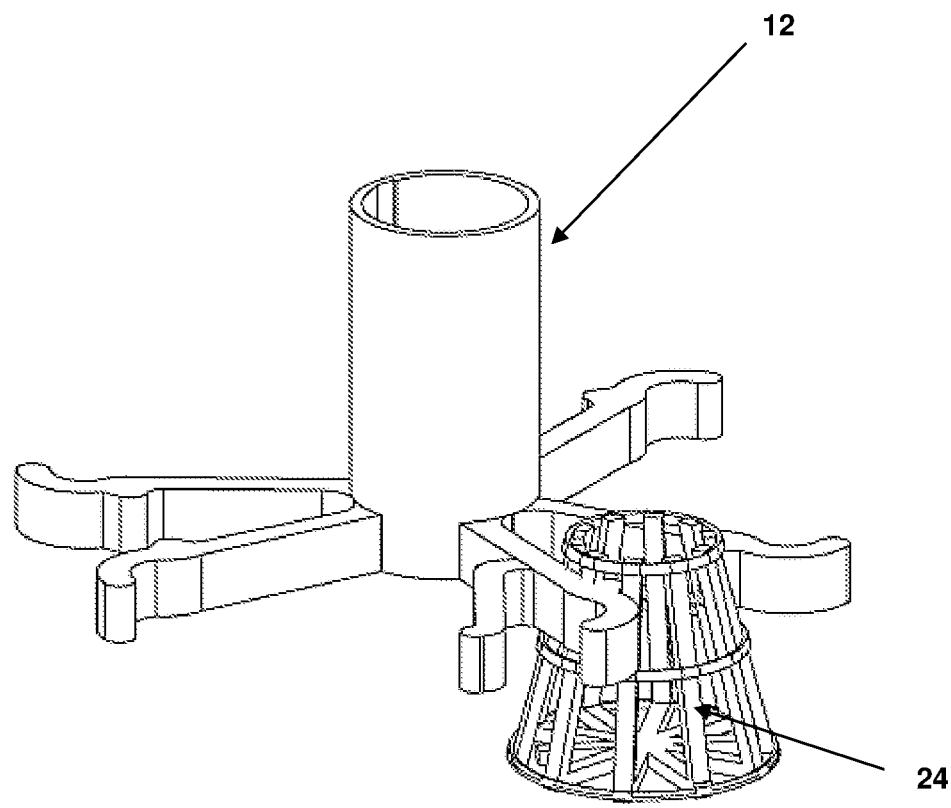
FIG. 4. Shot of the main isometric view of the Carousel with a bait structure.
Figure 5:
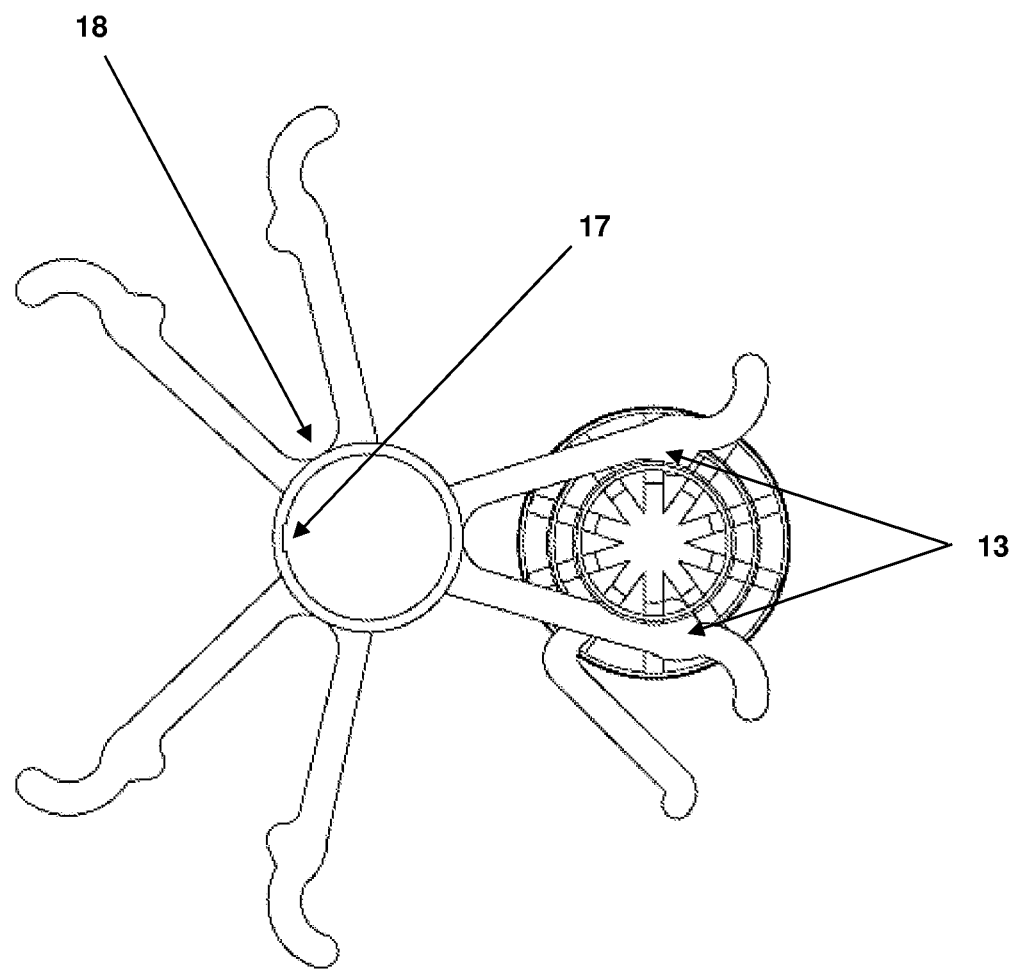
FIG. 5. Shot of the Carousel's main view from above with a bait structure.
Figure 6:
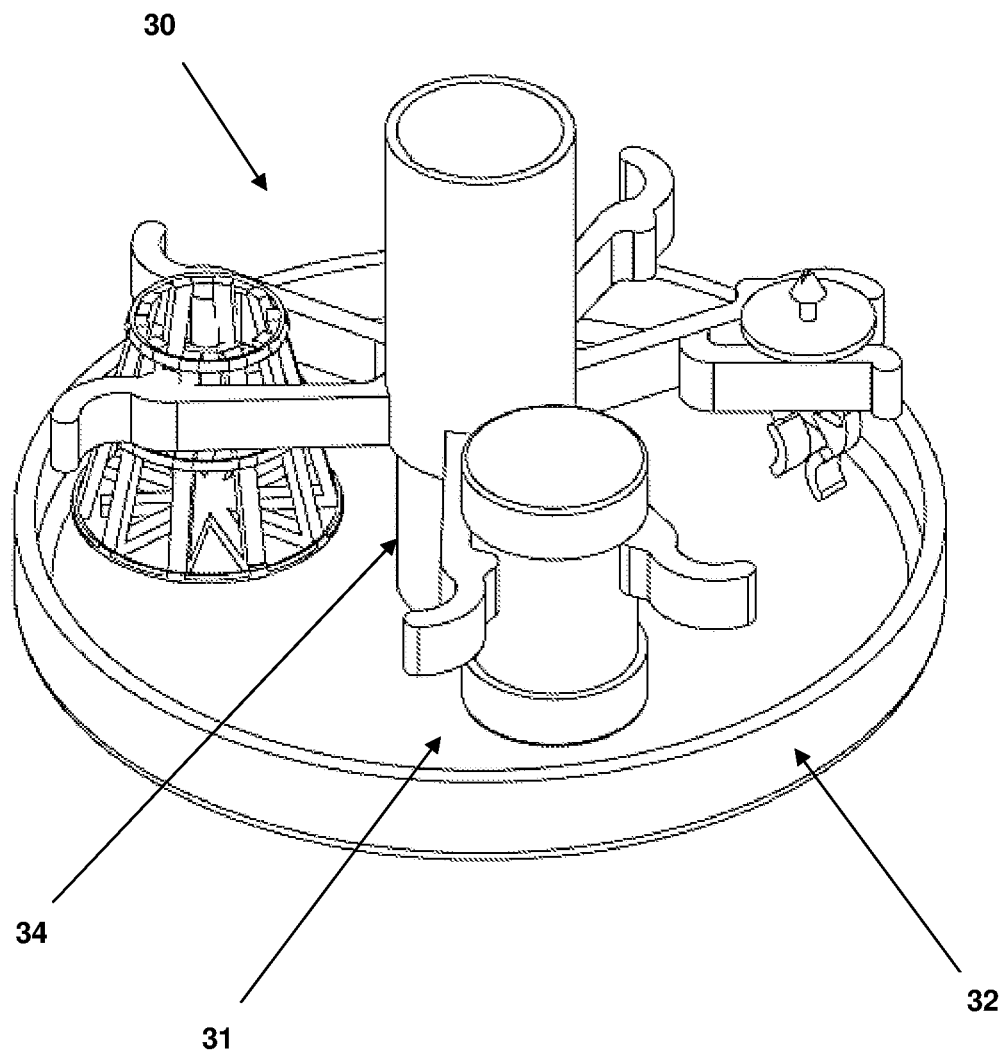
FIG. 6. Shot of the Carousel's main isometric view with bait structures mounted on a tray.

In FIG. 3 we may observe different types of bait structures 20, which may be a cylindric bait structure 21, cylindric bait structure with liquid 22, and staple bait structure 23 and the basket bait structure 24 may be seen in FIGS. 4 to 7, said structures have means to be secured in the clamping arms 11 and the additional clamping arm 15, in this context, the cylindric type bait structure 21 shows a cylindric part with a smaller diameter than its ends 25, which may be clamped by two clamping arms 11, as the size of the cylindric part 25 is such, that said cylindric part is fixed in the clamping arms 11, this may be seen in FIGS. 6 and 7, the cylindric type bait structure with liquid 22 is in the same situation for the securing of the cylindric type bait structure 21, the staple type bait structure 23 has a neck 27 which has been provided between the cap and the clamping clamps 28, thereby said neck 27 may be secured between a clamping arm 11 and the additional clamping arm 15, as observed in FIGS. 6 and 7, the basket type bait structure 24 is secured by two clamping arms 11 and specifically by the means of support 13 provided by said clamping arms, as observed in FIGS. 4 to 7, the basket type bait structure 24 comprises slits through which the means of support 13 are introduced and secured to the 7 basket type bait structure 24.

It is worth to mention that the clamping arms 11 as well as the additional clamping arms 15 may vary depending on the amount of bait structures 20 that shall be mounted on the carousel 10.

A basket type bait structure 24 may be seen in FIGS. 4 and 5, secured by two means of support 13, as well as observing the guide pin 17 arranged inside the tubular piece 12, an important characteristic that may be observed in the carousel is the coupling between the arms 18, which forms a semi-circumference at the level of the tubular piece and is projected to opposite sides in longitudinal lines towards a pair of clamping arms 11, this is clearly observed in the carousel's 10 view from above in FIG. 5.

FIGS. 6 and 7 show a tray 30 used for the mounting of the carousel 10 with bait structures 20, said tray shows a diametral surface bigger than the diametral surface of the carousel 10, this with the purpose of ingesting an insect and provide mortality conditions, allowing said insect to fall inside the tray 30, said tray comprises a wall 32 in its exterior periphery and said wall has a width or edge 33 which gives rigidity to the tray 30, which can be observed with more clarity in FIG. 7; the tray 30 is very important, as it may contain the dead insect, or accordingly, it may contain a liquid solution that will be used as bait, thus allowing the carousel-type insect trap 1 to be of assistance in the monitoring and control of insects.

Figure 8:
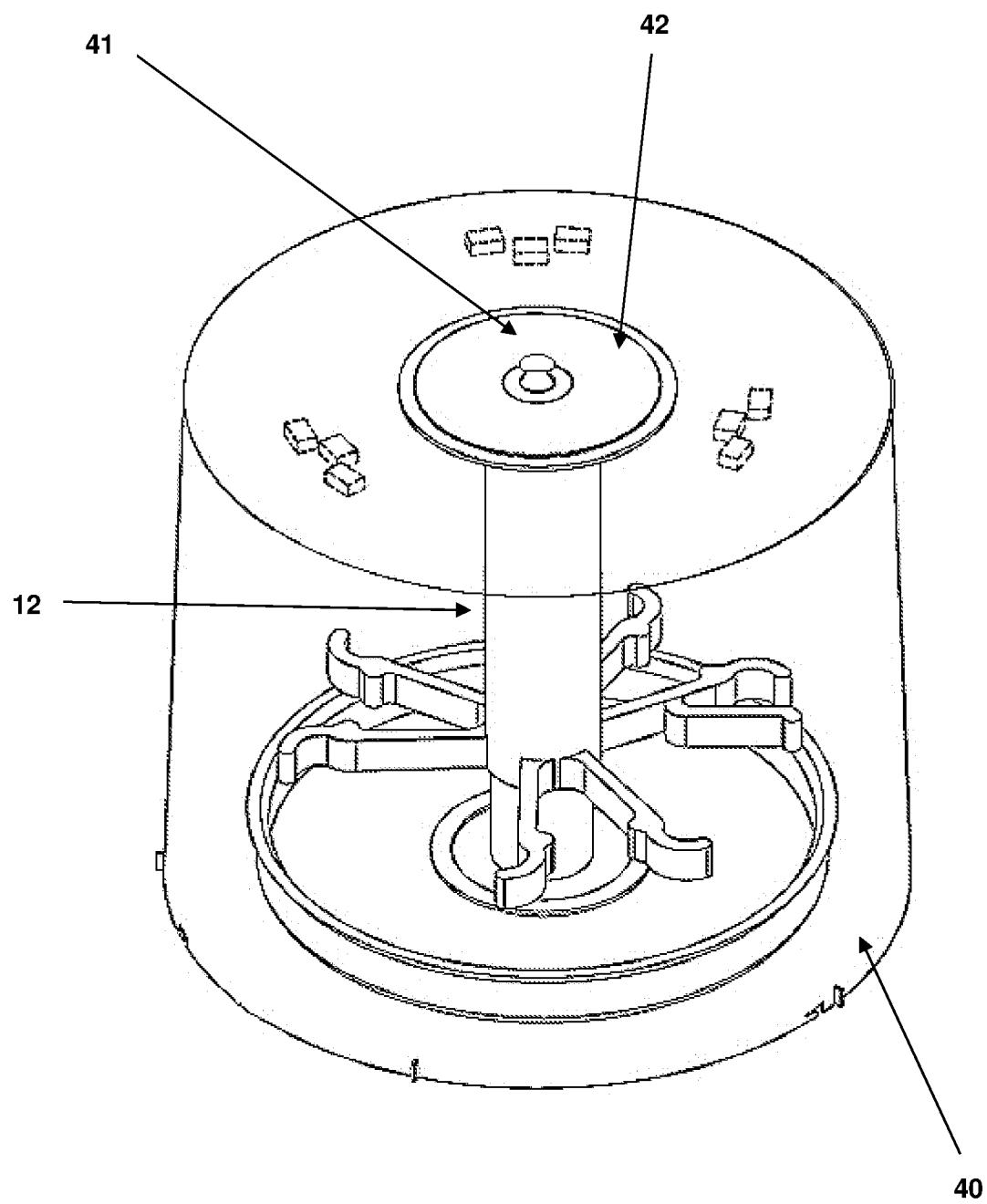
FIG. 8. Sample of the main isometric view of the Carousel with bait structures mounted on a tray, as well as the Carousel mounted on a tray, with its cover.
Figure 9:
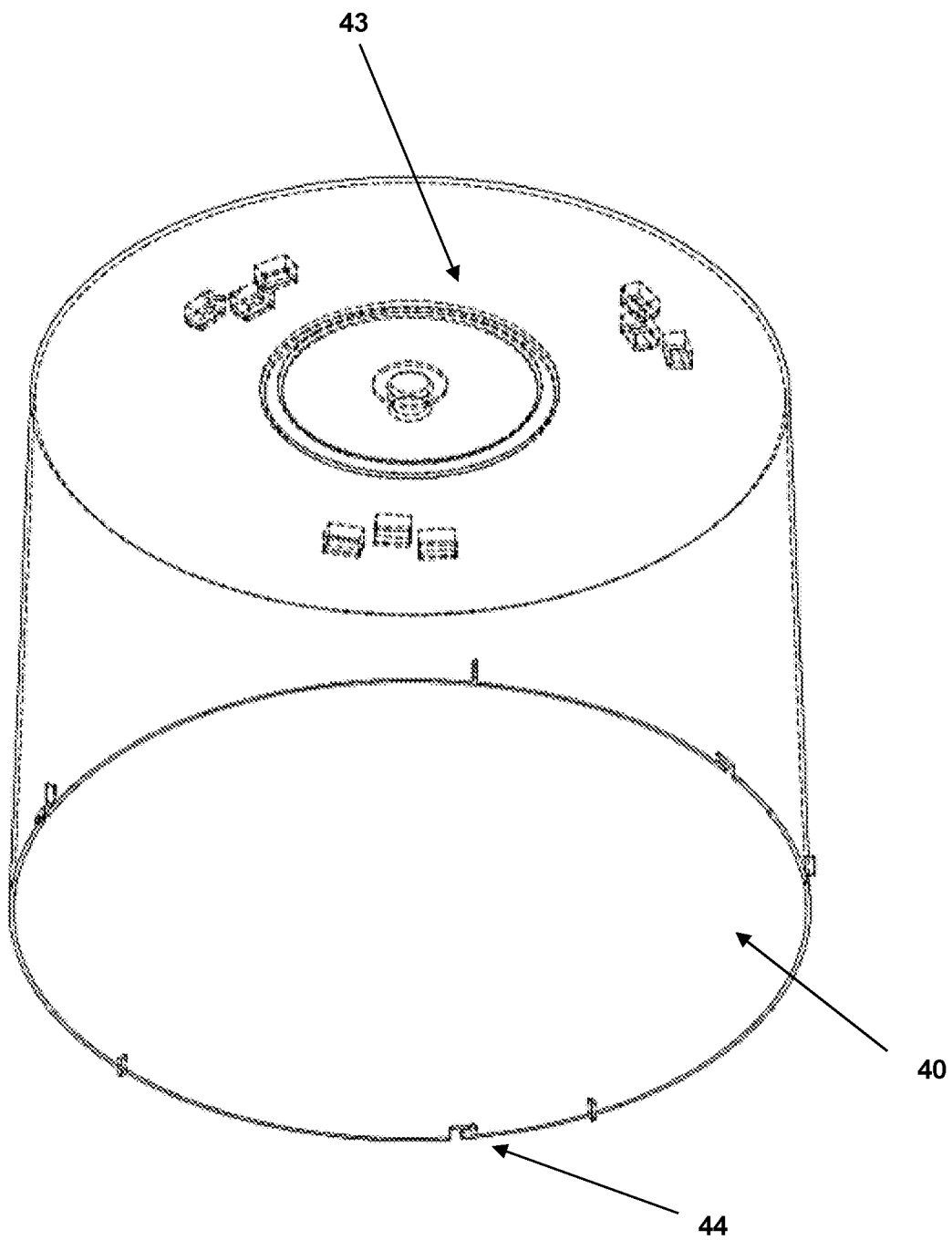
FIG. 9. Shows the cover's main isometric view.
Figure 10:
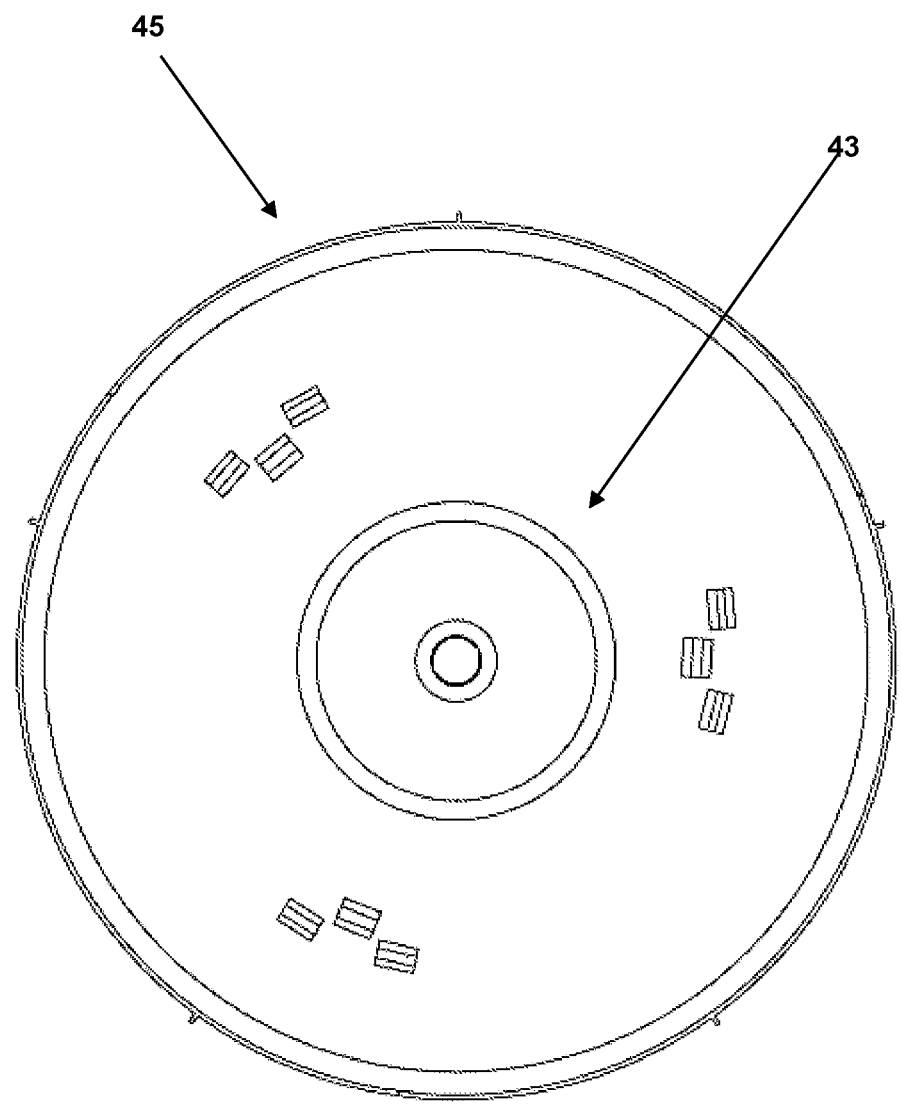
FIG. 10. Shows the cover's view from above.

FIG. 8 shows the carousel-type insect trap 1 with all of its elements, this figure shows the carousel's cover 40, which is a cover made preferably from transparent plastic, said cover shows a cylindric shape with a free lower wall and a covered upper wall, thus creating a cover for the carousel, the lower hollow wall will allow the passing of insects and the alternative of insects shall be flying towards the light in this case, towards the walls or the upper part of the cover, which will be closed, it is worth mentioning that between said tray 30 and the cover 40 a space has been provided, wide enough for insects to enter to the baits provided inside the bait structures 20 or in the tray 30, the carousel cover 40 shows a cover support 41, which allows the hanging of carousel-type insect trap 1, thereby conducting the monitoring and control of insects, the carousel's cover 40 has in addition a coupling piece 43 to fix the cylindric tube 12 with the carousel's cover, this may be observed in further detail in FIGS. 9 and 10, said means of coupling may be a threaded piece placed between the cylindric tube 12 and the coupling 12, which is fixed to the carousel's cover 40; however, another means of coupling may be placed conveniently, to fix the cylindric tube 12 to the carousel's cover 40, additionally, the carousel's cover 40 comprises slots for pins 44 inside the edge provided inside the peripheral wall 45 of the carousel's cover 40, said slots 44 allow the placement of a sealed means inside the lower part of the carousel's cover, allowing the withdrawal of dead insects or the safe transportation of the carousel's cover 40.

Figure 11:
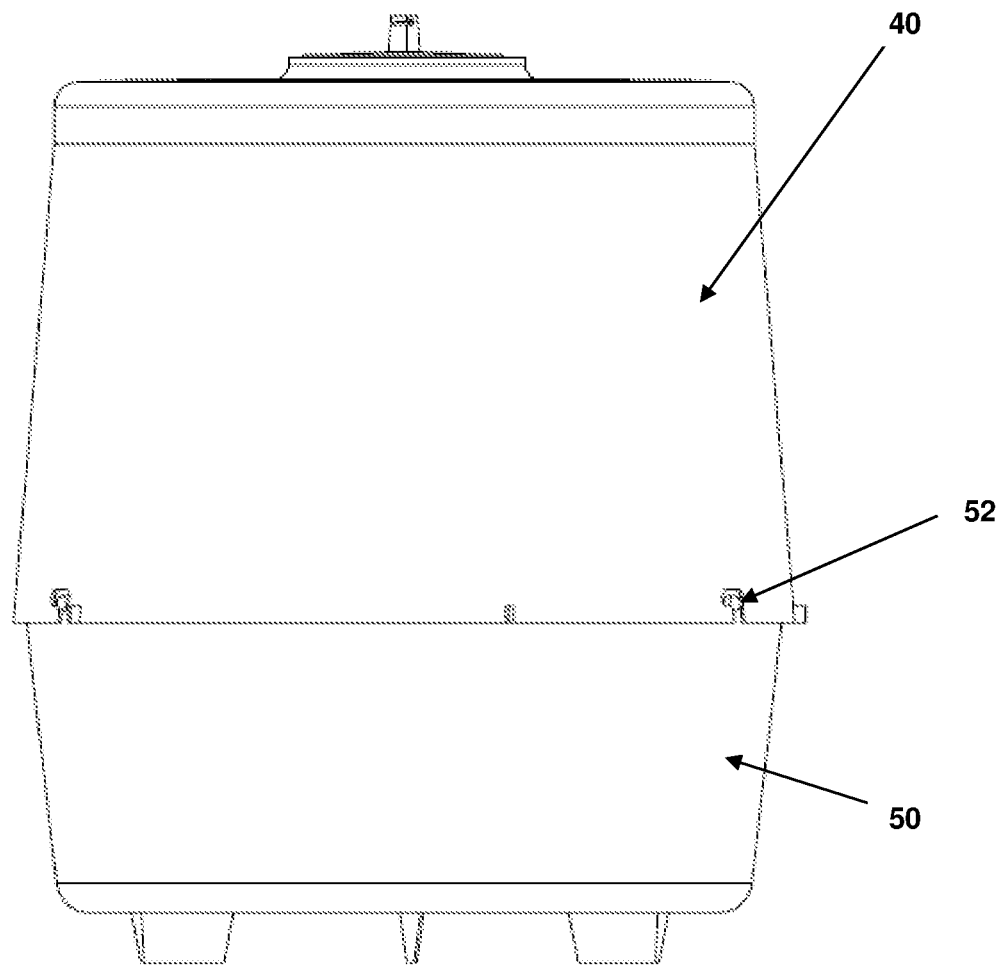
FIG. 11. Shows a frontal view of the Carousel-Type Insect Trap.
Figure 12:
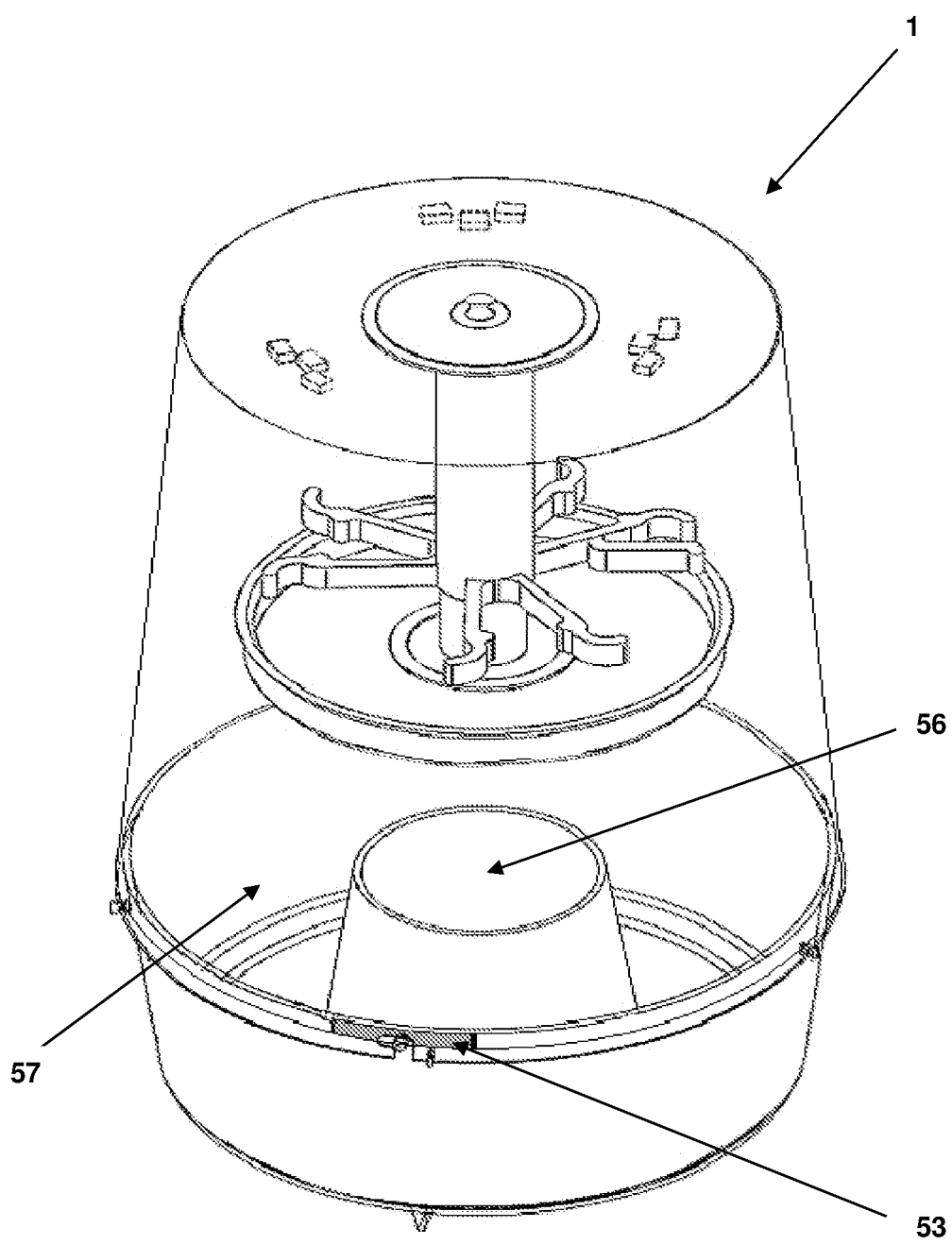
FIG. 12. Shows the main isometric view of the Carousel-Type Insect Trap with all of its components.

FIGS. 11 and 12 show the Carousel-Type Insect Trap with all the elements make up the trap, having as a complementary part of the invention the deposit for liquids 50, which is used to fix and support the carousel's cover 40, by being mounted above the deposit for liquids 50, said element is fixed by means of the pins 52 provided in the upper periphery of the deposit for liquids 50 in the slots for pins 44 provided in the carousel's cover 40, in addition to this securing, an edge inside the wall 53 has been provided throughout a fixed length, containing the pin, which has the same outer diameter as the deposit for liquids 50; therefore, when the carousel's cover 40 is joined to the deposit for liquids 50 both elements are inside a sealed coupling, which prevents the spillage of liquids, if any abrupt type of movement occurred inside the deposit for liquids.

Figure 13:
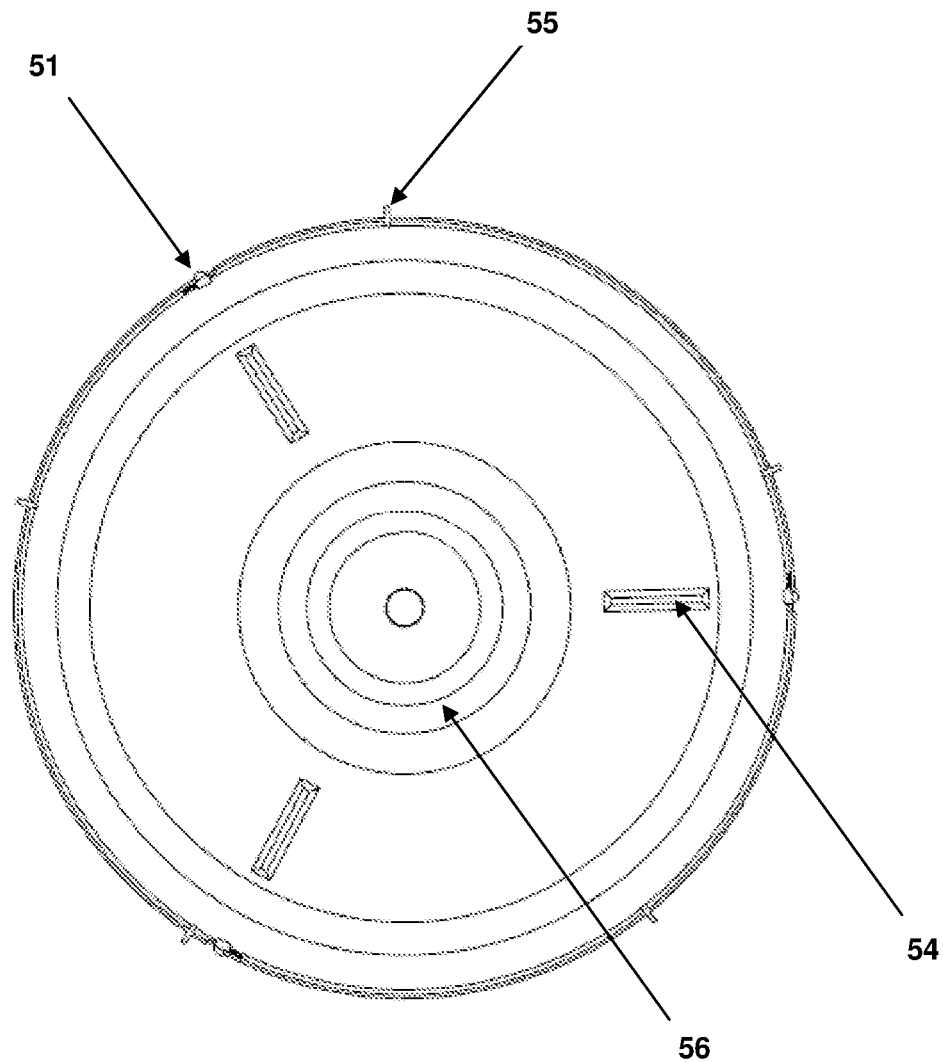
FIG. 13. Shows a plant view from below of the deposit for liquids.

FIG. 13 shows the deposit for liquids viewed from below, which allows the identification of the arrangement of the support legs 54 and their existing relationship between each other, the main function of said support legs 54 is generating a space between the deposit for liquids 50 and the surface used to place the Carousel-Type Insect Trap, as this space will allow insects to enter into the trap by means of the insect entry point 56 which may be observed also in FIG. 12, the entry of insects into the trap may occur by hanging the Carousel-Type Insect Trap from the supporting element 41 from the upper part and the entry of insects would occur through the conduit 56, without having the deposit of liquids 50 above a surface.

The entry conduit for insects 56 is preferably located at a height similar to that of the deposit for liquids 50 and said conduit is not covered by the tray 30, that being the case between the entry conduit for insects 56 and the deposit for liquids, thus creating a space for reception of liquids 57, which shall be used as bait for mosquitoes.

The cover of the carousel 40 has clamping means 55 located in the periphery of its lower part, which assist in the securing process for the carousel's cover 40 when the cover is sealed by the edge of the wall 53 between the pins 52 arranged in the deposit for liquids and the slots for pins 44 located on the carousel's cover.

In order to provide a better description of the invention, a list of the parts comprised by the Carousel-Type Insect Trap is presented below.

1 Carousel-Type Insect Trap
10 Carousel
11 Clamping Arm
12 Tubular Piece
13 Means of Support
14 Curved Ending of the Clamping Arm
15 Additional Clamping Arm
16 Curved End of the Additional Clamping Arm
17 Guide Pin
18 Coupling between Two Arms
19 Clamping Space
20 Bait Structure
21 Cylindric Type Bait Structure
22 Cylindric Type Bait Structure with Liquid
23 Staple Type Bait Structure
24 Basket Type Bait Structure
25 Cylindric Part with a Smaller Diameter than its Ends
26 Cylindric Part with a Smaller Diameter that one of its Ends
27 Neck 30 Tray
31 Bottom of the Tray
32 Peripheral Lateral Wall of the Tray
33 Edge of the Tray's Peripheral Wall
34 Central Axis of the Tray
35 Pin
40 Carousel's Cover
41 Support for the Cover
42 Coupling between the Tubular Piece and the Cover
43 Coupling Piece
44 Slots for Pins
45 Edge of the Cover's Peripheral Wall
50 Deposit for Liquids
51 Adjusting Edge
52 Pins
53 Wall's Edge
54 Support Legs
55 Means of Clamping
56 Entry Conduit for Insects
56 Reception Space for Liquid

The invention claimed is:

1. A carousel-type insect trap comprising:
a carousel comprising at least two clamping arms, which are coupled by a hollow tubular piece on its exterior surface, said clamping arms are longitudinally and concentrically projected into the tubular piece throughout a specific distance in order to carry out their clamping functions;
a tray that has in its center a tray axis, which is fixed inside the hollow tubular piece;
a carousel cover with a cylindric shape with a hollow lower surface and a covered upper part, the carousel cover has a coupling piece to fix the hollow tubular piece into the carousel cover;
a cover support used to hang the carousel-type insect trap; and
a deposit for liquids that contains an entry conduit for insects and one adjusting edge on an upper outer part arranged for a sealing between the carousel cover and the deposit for liquids.

2. The carousel-type insect trap, in accordance with claim 1, characterized by the carousel having in each clamping arm a means of support located near to a distal end of each clamping arm.

3. The carousel-type insect trap, in accordance with claim 2, characterized by said means of support being used to secure bait structures in place.

4. The carousel-type insect trap, which, in accordance with claim 3, is characterized by the clamping arms having a curved ending for the manipulation of each clamping arm by a user, in order to place bait structures, without touching an attractant substance and preserve said attractant substance intact.

5. The carousel-type insect trap in accordance with claim 1, characterized by the carousel additionally comprising an additional clamping arm, which is projected into a clamping arm of the at least two clamping arms; thereby placing an additional clamping arm in the clamping arm.

6. The carousel-type insect trap, in accordance with claim 5, characterized by the additional clamping arm has having a curved ending in order to manipulate said arms separate and to insert a bait structure between the additional clamping arm and the clamping arm of the at least two clamping arms.

7. The carousel-type insect trap, in accordance with claim 1, characterized by the clamping arms being arranged in pairs by a coupling located in proximity to the tubular piece, thereby the pair of clamping arms comprise a means of support between inner walls of each arms, which allows for the clamping of a bait structure.

8. The carousel-type insect trap, in accordance with claim 3, characterized by the clamping arms having flexibility in order to be slightly separated in order to introduce each bait structure between said means of support and secure said bait structure, when the means of support are released from tension.

9. The carousel-type insect trap, in accordance with claim 3, characterized by a clamping space being created between the clamping arms, acting as a supporting clamp for a cylindrical structure and the means of support, which in turn act as a means of blockage in order to fully fix each bait structure between a pair of clamping arms.

10. The carousel-type insect trap, in accordance with claim 1, characterized by the tubular piece being hollow, with a guide pin inside, which is longitudinally projected in an internal part of the tubular piece.

11. The carousel-type insect trap, in accordance with claim 3, characterized by the bait structures may be cylindric type bait structures, cylindric type bait structures with liquid, staple type bait structures, and basket type bait structures.

12. The carousel-type insect trap, in accordance with claim 11, characterized by the cylindric-type bait structures having a cylindric part with a smaller diameter than ends, which is clamped by the two clamping arms, as the size of the cylindric part is such that said part is able to be fixed between the clamping arms.

13. The carousel-type insect trap, in accordance with claim 11, characterized by the staple type bait structures having a neck which is between a cap and a set of clamping clamps, thereby, said neck is secured between a clamping arm of the at least two clamping arms and an additional clamping arm which is projected into the clamping arm of the at least two clamping arms.

14. The carousel-type insect trap, in accordance with claim 11, characterized by the basket type bait structures being secured by the means of support provided by said clamping arms, wherein the basket type bait structure has slits, used to introduce and attach the means of support to the basket type bait structure.

15. The carousel-type insect trap, in accordance with claim 11, characterized by having the clamping arms, as well as an additional clamping arm which is projected into a maximum of one clamping arm of the at least two clamping arms.

16. The carousel-type insect trap in accordance with claim 1, characterized by the tray having in its periphery an exterior wall and said wall has a width or edge which gives rigidity to the tray.

17. The carousel-type insect trap, in accordance with claim 16, characterized by the tray having a deposit, to contain the dead insect, or a liquid solution.

18. The carousel-type insect trap, in accordance with claim 16, characterized by between the tray and the carousel cover a space is provided, which is big enough for insects to enter to baits provided inside the bait structures or in the tray.

19. The carousel-type insect trap, which, in accordance to claim 16, is characterized by the carousel cover having pins arranged inside an edge of a peripheral wall of the carousel cover, said pins allow the placement of a sealing means.

20. The carousel-type insect trap, in accordance with claim 1, characterized by the adjusting edge being arranged on the upper outer part of a wall of the deposit for liquids is arranged with a fixed length, containing a pin, with the same outer diameter as the carousel cover, therefore, when the carousel cover is coupled with the deposit for liquids, both are in a sealed coupling, which prevents liquid from spilling.

21. The carousel-type insect trap, in accordance with claim 1, characterized by the deposit for liquids, having support legs creating a space between the deposit for liquids, including the entry conduit for insects, and a support surface for the carousel-type insect trap.

22. The carousel-type insect trap, in accordance with claim 1, characterized by the carousel cover having a lower end and a plurality of slots provided in a periphery of the lower end, the deposit of liquids having a plurality of pins engaging the plurality of slots of the lower end of the carousel cover to secure the carousel cover to the deposit of liquids.

\* \* \* \* \*